(12) United States Patent
Lee

(10) Patent No.: US 10,926,744 B2
(45) Date of Patent: Feb. 23, 2021

(54) SELF-ENERGIZING BRAKE CALIPER

(71) Applicants: Kyung Chang Industrial Co., Ltd., Daegu (KR); Kwangjin Michael Lee, Daegu (KR)

(72) Inventor: Kwangjin Michael Lee, Daegu (KR)

(73) Assignee: Kyung Chang Industrial Co., Ltd., Daegu (KR)

( * ) Notice: Subject to any disclaimer, the term of this patent is extended or adjusted under 35 U.S.C. 154(b) by 3 days.

(21) Appl. No.: 16/531,450

(22) Filed: Aug. 5, 2019

(65) Prior Publication Data

US 2020/0223403 A1 Jul. 16, 2020

Related U.S. Application Data

(63) Continuation of application No. 16/351,754, filed on Mar. 13, 2019, now abandoned.

(30) Foreign Application Priority Data

Jan. 16, 2019 (KR) .......................... 10-2019-0005835

(51) Int. Cl.
*B60T 1/06* (2006.01)
*F16D 55/224* (2006.01)
(Continued)

(52) U.S. Cl.
CPC .......... *B60T 1/065* (2013.01); *F16D 55/2245* (2013.01); *F16D 65/0056* (2013.01);
(Continued)

(58) Field of Classification Search
CPC ............. F16D 55/2245; F16D 65/0056; F16D 65/0075; F16D 65/095; F16D 65/183
See application file for complete search history.

(56) References Cited

U.S. PATENT DOCUMENTS 2,348,078 A * 5/1944 Ledwinka ........... F16D 55/2245
188/59
2,713,400 A * 7/1955 Coskun ............... F16D 55/2245
188/59

(Continued)

FOREIGN PATENT DOCUMENTS

JP 2018528363 A 9/2018
KR 10-1262832 B1 5/2013

(Continued)

*Primary Examiner* — Vishal R Sahni
(74) *Attorney, Agent, or Firm* — Nelson Mullins Riley & Scarborough LLP; Kongsik Kim, Esq.

(57) ABSTRACT

A self-energizing brake caliper comprises a caliper bracket fixed to a vehicle frame, a first caliper arm rotatably connected to the caliper bracket, a second caliper arm rotatably connected to the caliper bracket, an inboard brake pad, and an outboard brake pad. The first caliper arm is rotatably connected to the outboard brake pad at a first position and is configured to press against the outboard brake pad at the first position by receiving the power of an actuator at the second position which is inboard side. The second caliper arm is rotatably connected to the inboard brake pad at a third position and is configured to press against the inboard brake pad at the third position by receiving the power of an actuator at the fourth position which is inboard side.

20 Claims, 18 Drawing Sheets

(51) Int. Cl.

| | | |
|---|---|---|
| *F16D 65/00* | (2006.01) | |
| *F16D 65/095* | (2006.01) | |
| *F16D 65/18* | (2006.01) | |
| B62L 1/00 | (2006.01) | |
| B62L 3/02 | (2006.01) | |
| F16D 55/00 | (2006.01) | |
| F16D 121/04 | (2012.01) | |
| F16D 121/14 | (2012.01) | |
| F16D 121/24 | (2012.01) | |
| F16D 125/64 | (2012.01) | |

(52) U.S. Cl.
CPC ....... *F16D 65/0075* (2013.01); *F16D 65/095* (2013.01); *F16D 65/183* (2013.01); *B60T 2270/82* (2013.01); *B62L 1/005* (2013.01); *B62L 3/02* (2013.01); *F16D 2055/002* (2013.01); *F16D 2055/0008* (2013.01); *F16D 2121/04* (2013.01); *F16D 2121/14* (2013.01); *F16D 2121/24* (2013.01); *F16D 2125/64* (2013.01)

(56) References Cited

U.S. PATENT DOCUMENTS

| | | | | |
|---|---|---|---|---|
| 3,003,589 | A * | 10/1961 | Desbrow | F16D 55/2245 188/72.3 |
| 3,109,517 | A * | 11/1963 | Smith | F16D 55/2245 188/71.7 |
| 3,129,789 | A * | 4/1964 | Hodkinson | F16D 65/567 188/71.9 |
| 3,137,368 | A * | 6/1964 | Press | F16D 65/54 188/72.6 |
| 3,189,128 | A * | 6/1965 | Herbert | F16D 55/2245 188/59 |
| 3,465,849 | A * | 9/1969 | Bernfeld | F16D 65/46 188/71.9 |
| 3,489,022 | A * | 1/1970 | Krahl | F16D 65/46 74/105 |
| 4,019,608 | A * | 4/1977 | Johnson | F16D 55/2245 188/59 |
| 4,060,153 | A * | 11/1977 | Kobelt | B66D 5/14 188/72.6 |
| 4,108,285 | A * | 8/1978 | Kobelt | F16D 55/2245 188/153 D |
| 4,155,431 | A * | 5/1979 | Johnson | F16D 55/2245 188/167 |
| 4,193,479 | A * | 3/1980 | Quilici | B62L 3/08 188/2 A |
| 4,270,631 | A * | 6/1981 | Kobelt | F16D 55/2245 188/71.1 |
| 4,393,962 | A * | 7/1983 | Kobelt | F16D 55/2245 188/59 |
| 5,547,047 | A * | 8/1996 | Kohar | B61H 5/00 188/205 A |
| 9,932,051 | B2 * | 4/2018 | Suzuki | F16D 55/2255 |
| 2005/0139435 | A1 * | 6/2005 | Jelley | F16D 53/00 188/72.2 |

FOREIGN PATENT DOCUMENTS

| | | |
|---|---|---|
| KR | 10-1509976 B1 | 4/2015 |
| KR | 10-20170104771 A | 9/2017 |
| KR | 10-20180048814 A | 5/2018 |

* cited by examiner

SELF-ENERGIZING BRAKE CALIPER

CROSS-REFERENCE TO RELATED APPLICATION

The present application is a continuation application of U.S. patent application Ser. No. 16/351,754 filed on Mar. 13, 2019, which is incorporated herein by reference. The present application claims priority to Korean Application No. 10-2019-0005835 filed on Jan. 16, 2019, which is incorporated herein by reference.

TECHNICAL FIELD

The present disclosure relates to a self-energizing brake caliper.

BACKGROUND

In a hydraulic brake system, a driver presses a brake pedal so that the pressure generated by a master cylinder is transferred to braking force by disc brake caliper or drum brake wheel cylinder. A self-energizing brake for amplifying the braking force has been known. For example, the self-energizing brake using a ball and ramp is disclosed by U.S. Pat. No. 5,012,901 and the self-energizing brake using wedge-effect is disclosed by U.S. Pat. No. 6,318,513, US Patent Application Publication Nos. 2008/0230330A1 and 2009/0065311A1.

The self-energizing brake according to the prior arts has complex structure, low productivity and high manufacturing costs. In particular, many reasons including self-locking effects in the wedge structure makes the self-energizing brake inapplicable.

Brake-by-wire system uses EMB (electro-mechanical brake) caliper driven by an electric motor. In order to apply the caliper in a front-wheel disc brake, the braking force generated by the motor should be greatly amplified.

SUMMARY

Accordingly, the present disclosure has been made in view of the above-mentioned problems occurring in the prior art, and it is an object of the present disclosure to provide a self-energizing brake caliper having no self-locking while the braking force generated by a hydraulic cylinder or a motor is greatly amplified, thereby serving excellent braking force.

To accomplish the above-mentioned object, according to the present disclosure, there is provided a self-energizing brake caliper comprising: a caliper bracket (10) fixed to a vehicle frame; a first caliper arm (20) rotatably connected to the caliper bracket (10); a second caliper arm (30) rotatably connected to the caliper bracket (10); an inboard brake pad (40); and an outboard brake pad (50).

The first caliper arm (20) is rotatably connected to the outboard brake pad (50) at a first position and is configured to press against the outboard brake pad (50) at the first position by receiving the power of an actuator (100) at the second position which is inboard side.

The second caliper arm (30) is rotatably connected to the inboard brake pad (40) at a third position and is configured to press against the inboard brake pad (40) at the third position by receiving the power of an actuator (100) at the fourth position which is inboard side.

The first caliper arm (20) and the second caliper arm (30) can be rotatably connected to the caliper bracket (10) at the same rotation axis (12).

The first caliper arm (20) and the second caliper arm (30) can be rotatably connected to the caliper bracket (10) at different rotation axis.

A first mounting hole can be provided at one of the inboard brake pad (40) and the second caliper arm (30) and a second mounting hole can be provided at the other one of the inboard brake pad (40) and the second caliper arm (30). A pin can pass through the first mounting hole and the second mounting hole to enable hinge movement of the inboard brake pad (40) and the second caliper arm (30) with respect to each other.

A third mounting hole can be provided at one of the outboard brake pad (50) and the first caliper arm (20) and a fourth mounting hole is provided at the other one of the outboard brake pad (50) and the first caliper arm (20). A pin can pass through the third mounting hole and the fourth mounting hole to enable hinge movement of the outboard brake pad (50) and the first caliper arm (20) with respect to each other.

The self-energizing brake caliper of the present disclosure can further comprise a first hinge member having at least one hole which is aligned with the first mounting hole and the second mounting hole.

The self-energizing brake caliper of the present disclosure can further comprise a second hinge member having at least one hole which is aligned with the third mounting hole and the fourth mounting hole.

According to the other aspect of the present disclosure, the first caliper arm (20) receives the power of an actuator at 1-1 position; is rotatably connected to the caliper bracket (10) at 2-1 position; is rotatably connected to the outboard brake pad (50) at 3-1 position which is between the 1-1 position and the 2-1 position; and is configured to press against the outboard brake pad (50) at the 3-1 position by the power of the actuator. Further, the second caliper arm (30) receives the power of an actuator at 4-1 position; is rotatably connected to the caliper bracket (10) at 2-1 position; is rotatably connected to the inboard brake pad (40) at a sixth position which is between the 4-1 position and the 2-1 position; and is configured to press against the inboard brake pad (40) at the sixth position by the power of the actuator.

The first caliper arm (20) and the second caliper arm (30) can be rotatably connected to the caliper bracket (10) at the same rotation axis.

The first caliper arm (20) and the second caliper arm (30) can be rotatably connected to the caliper bracket (10) at different rotation axis.

A first mounting hole can be provided at one of the inboard brake pad (40) and the second caliper arm (30) and a second mounting hole can be provided at the other one of the inboard brake pad (40) and the second caliper arm (30). A pin can pass through the first mounting hole and the second mounting hole to enable hinge movement of the inboard brake pad (40) and the second caliper arm (30) with respect to each other.

A third mounting hole can be provided at one of the outboard brake pad (50) and the first caliper arm (20) and a fourth mounting hole can be provided at the other one of the outboard brake pad (50) and the first caliper arm (20). A pin can pass through the third mounting hole and the fourth mounting hole to enable hinge movement of the outboard brake pad (50) and the first caliper arm (20) with respect to each other.

The self-energizing brake caliper according to the other aspect of the present disclosure can further comprise a first hinge member having at least one hole which is aligned with the first mounting hole and the second mounting hole.

The self-energizing brake caliper according to the other aspect of the present disclosure can further comprise a first hinge member having at least one hole which is aligned with the first mounting hole and the second mounting hole.

The self-energizing brake caliper according to the other aspect of the present disclosure can further comprising a second hinge member having at least one hole which is aligned with the third mounting hole and the fourth mounting hole.

The self-energizing brake caliper according to the present disclosure can further comprising at least one first auxiliary arm and at least one second auxiliary arm. The first caliper arm is rotatably connected to the caliper bracket at a first rotation axis; the second caliper arm is rotatably connected to the caliper bracket at a second rotation axis; the first auxiliary arm is rotatably connected to the caliper bracket and is rotatably connected to the inboard brake pad at 6-1 position; and the second auxiliary arm is rotatably connected to the caliper bracket and is rotatably connected to the outboard brake pad at 5-1 position.

The first auxiliary arm can be rotatably connected to the caliper bracket at the first rotation axis; and the second auxiliary arm can be rotatably connected to the caliper bracket at the second rotation axis.

The first auxiliary arm can be rotatably connected to the caliper bracket at a third rotation axis other than first rotation axis; and the second auxiliary arm can be rotatably connected to the caliper bracket at a fourth rotation axis other than the second rotation axis.

A 1-1 mounting hole can be provided at one of the first auxiliary arm and the inboard brake pad; a 1-2 mounting hole can be provided at the other one of the first auxiliary arm and the inboard brake pad; and the pin can pass through the 1-1 mounting hole and the 1-2 mounting hole to enable hinge movement of the inboard brake pad and the first auxiliary arm with respect to each other.

A 2-1 mounting hole can be provided at one of the second auxiliary arm and the outboard brake pad; a 2-2 mounting hole can be provided at the other one of the second auxiliary arm and the outboard brake pad; and the pin can pass through the 2-1 mounting hole and the 2-2 mounting hole to enable hinge movement of the outboard brake pad and the second auxiliary arm with respect to each other.

The self-energizing brake caliper of the present disclosure can further comprise a 1-1 hinge member having at least one hole which is aligned with the 1-1 mounting hole and the 1-2 mounting hole.

The self-energizing brake caliper of the present disclosure can further comprise a 2-1 hinge member having at least one hole which is aligned with the 2-1 mounting hole and the 2-2 mounting hole.

The self-energizing brake caliper according to of the present disclosure can further comprise a first auxiliary arm which is rotatably connected to the caliper bracket and is rotatably connected to the inboard brake pad at a seventh position; and a second auxiliary arm which is rotatably connected to the caliper bracket and is rotatably connected to the outboard brake pad at an eight position.

A 3-1 mounting hole can be provided at one of the first auxiliary arm and the inboard brake pad; a 3-2 mounting hole can be provided at the other one of the first auxiliary arm and the inboard brake pad; and the pin can pass through the 3-1 mounting hole and the 3-2 mounting hole to enable hinge movement of the inboard brake pad and the first auxiliary arm each other.

A 4-1 mounting hole can be provided at one of the second auxiliary arm and the outboard brake pad; a 4-2 mounting hole can be provided at the other one of the second auxiliary arm and the outboard brake pad; and the pin can pass through the 4-1 mounting hole and the 4-2 mounting hole to enable hinge movement of the outboard brake pad and the second auxiliary arm with respect to each other.

The self-energizing brake caliper of the present disclosure can further comprise a 3-1 hinge member having at least one hole which is aligned with the 3-1 mounting hole and the 3-2 mounting hole.

The self-energizing brake caliper of the present disclosure can further comprise a 4-1 hinge member having at least one hole which is aligned with the 4-1 mounting hole and the 4-2 mounting hole.

The self-energizing brake caliper according to the present disclosure can further comprise a first auxiliary arm which is rotatably connected to the caliper bracket and is rotatably connected to the inboard brake pad at a 6-1 position; and a second auxiliary arm which is rotatably connected to the caliper bracket and is rotatably connected to the outboard brake pad at a 5-1 position.

A 5-1 mounting hole can be provided at one of the first auxiliary arm and the inboard brake pad; a 5-2 mounting hole can be provided at the other one of the first auxiliary arm and the inboard brake pad; and the pin can pass through the 5-1 mounting hole and the 5-2 mounting hole to enable hinge movement of the inboard brake pad and the first auxiliary arm with respect to each other.

A 6-1 mounting hole can be provided at one of the second auxiliary arm and the outboard brake pad; a 6-2 mounting hole can be provided at the other one of the second auxiliary arm and the outboard brake pad; and the pin can pass through the 6-1 mounting hole and the 6-2 mounting hole to enable hinge movement of the outboard brake pad and the second auxiliary arm with respect to each other.

The self-energizing brake caliper according to the present disclosure can further comprise a 5-1 hinge member having at least one hole which is aligned with the 5-1 mounting hole and the 5-2 mounting hole.

The self-energizing brake caliper according to the present disclosure can further comprise a 6-1 hinge member having at least one hole which is aligned with the 6-1 mounting hole and the 6-2 mounting hole.

According to the present disclosure, the first auxiliary arm is configured to be parallel to the inboard portion of the second caliper arm; and the second auxiliary arm is configured to be parallel to the outboard portion of the first caliper arm.

BRIEF DESCRIPTION OF DRAWINGS

The present disclosure will be more fully understood from the following detailed description taken in conjunction with the accompanying drawings.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, the present disclosure will be described in detail with reference to the accompanying drawings. As those skilled in the art would realize, the described embodiments may be modified in various different ways, all without departing from the spirit or scope of the present disclosure.

In the present specification, the term "inboard" means the vehicle side of the brake disc, and the term "outboard" means the opposite side of the vehicle side.

Figure 1:
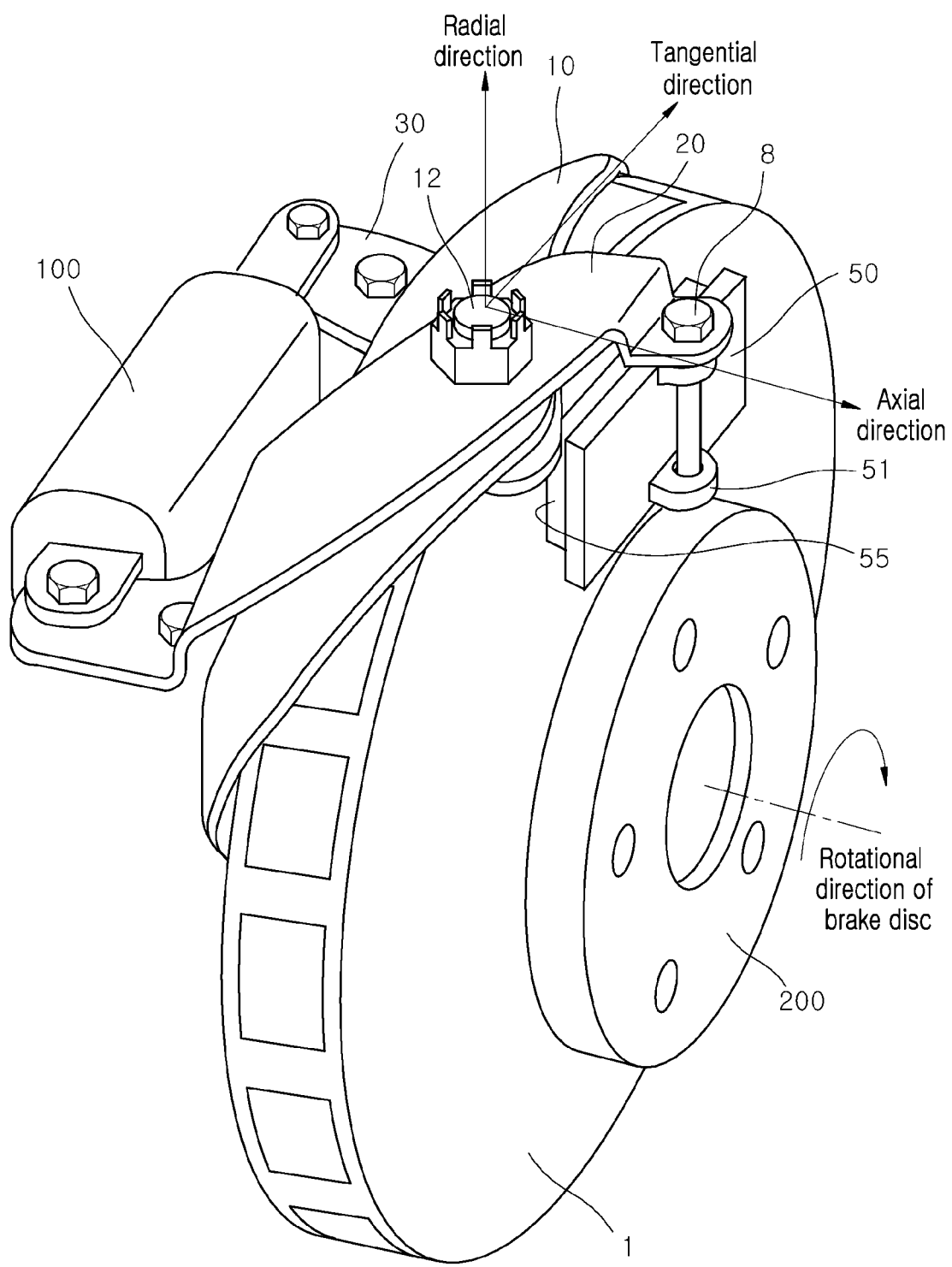
FIG. 1 shows a perspective view of a brake disc where a self-energizing brake caliper according to the present disclosure is mounted.
Figure 2:
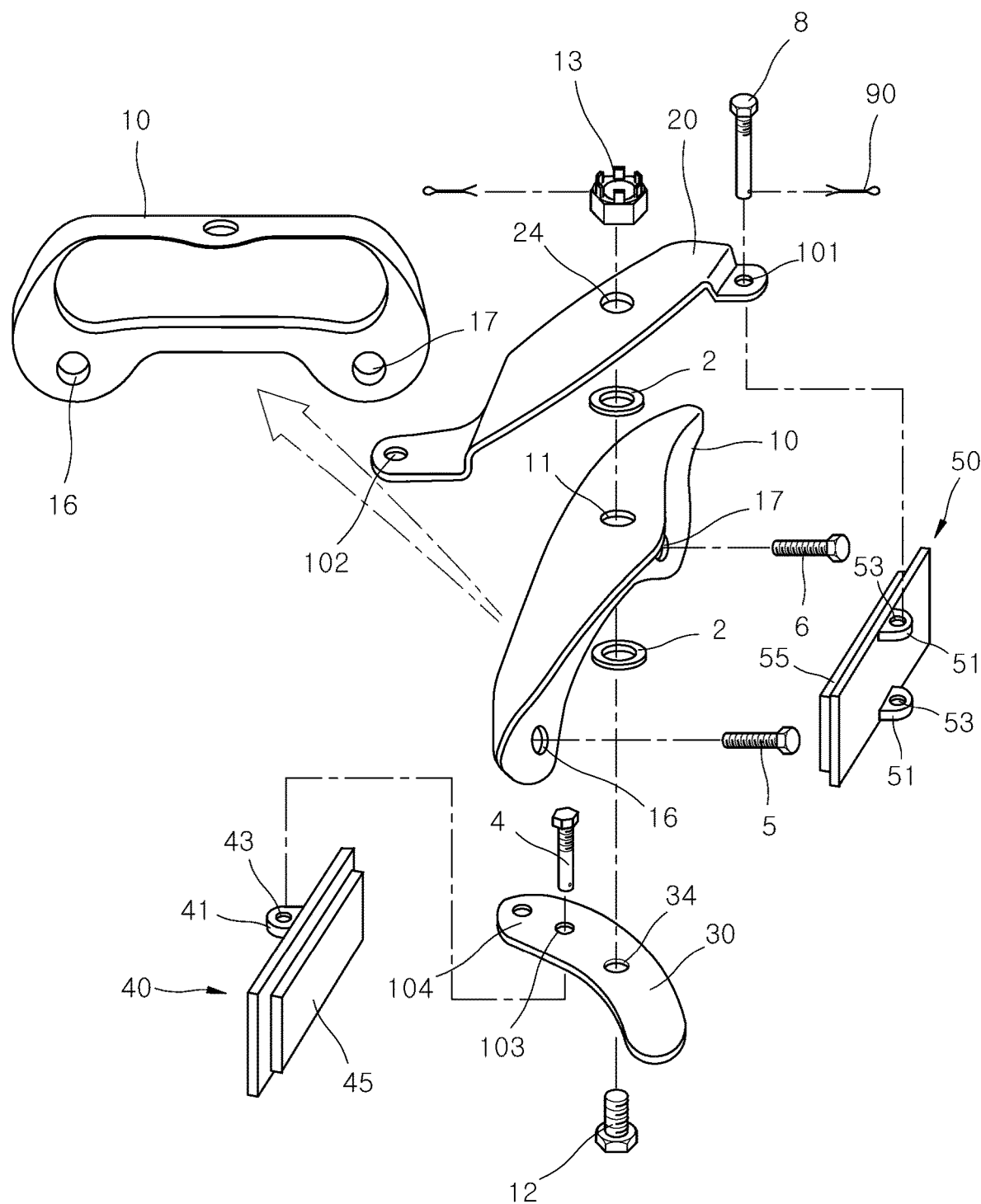
FIG. 2 shows an exploded perspective view of the self-energizing brake caliper and brake pads of the self-energizing brake caliper of FIG. 1.

FIG. 1 shows a perspective view of a brake disc where a self-energizing brake caliper according to the present disclosure is mounted. FIG. 2 shows an exploded perspective view of the self-energizing brake caliper and brake pads according to the self-energizing brake caliper of FIG. 1.

The self-energizing brake caliper comprises a caliper bracket (10), a first caliper arm (20), a second caliper arm (30), an inboard brake pad (40) and an outboard brake pad (50).

The caliper bracket (10) is fixed to a vehicle frame and comprises a rotation axis (12) which extends vertically or between 9 o'clock and 3 o'clock in the direction of height of the brake disc. The caliper bracket (10) can be fixed to a vehicle frame by use of mounting bolts (5, 6). The vehicle frame is a portion which does not rotate while wheels rotate. For example, a suspension knuckle can be the vehicle frame. A pivot bolt (12) can be the rotation axis. The pivot bolt (12) can pass through a mounting hole (11) of the caliper bracket (10) and then be rotatably connected to the first caliper arm (20). The end of the pivot bolt (12) can be fastened by a castle nut (13) for preventing it from loosening. A thrust washer (2) or a thrust bearing can be used between the caliper arms (20, 30) and the caliper bracket (10) for smooth rotation of the caliper arms (20, 30).

The actuator (100) of the present disclosure is a device for generating braking force to be applied to the braking pads. The actuator (100) can be a hydraulic cylinder for a hydraulic braking system, or a power pack for a brake-by-wire system which comprises an electric motor, reducer, displacement sensor, force sensor and the like. The actuator (100) can be a cable-type device, for example, a direct pull which is used in bicycles or motor cycles. Any other device that allows the first caliper arm (20) and the second caliper arm (30) to perform scissor movement can be used as the actuator of the present disclosure.

The first caliper arm (20) is rotatably connected to the outboard brake pad (50) at a first position (101). The first caliper arm (20) receives the power of the actuator (100) at a second position (102) which is inboard side so as to press or release the outboard brake pad (50) at the first position (101). The outboard brake pad (50) has a connecting portion (51) where a mounting hole (53) can be provided.

A pin member (8) can pass through a mounting hole formed at the first position (101) and the mounting hole (53) of the outboard brake pad (50) to connect the first caliper arm (20) and the outboard brake pad (50), thereby allowing the first caliper arm (20) and the outboard brake pad (50) to perform hinge movement with respect to each other.

The second caliper arm (30) is rotatably connected to the inboard brake pad (40) at a third position (103). The second caliper arm (30) receives the power of the actuator (100) at a fourth position (104) which is inboard side so as to press or release the inboard brake pad (40) at the third position (103). The inboard brake pad (40) has a connecting portion (41) where a mounting hole (43) can be provided.

The inboard brake pad (40) has a friction member (45) which contacts the brake disc (1) in inboard side. The outboard brake pad (50) has a friction member (55) which contacts the brake disc (1) in outboard side.

Figure 3:
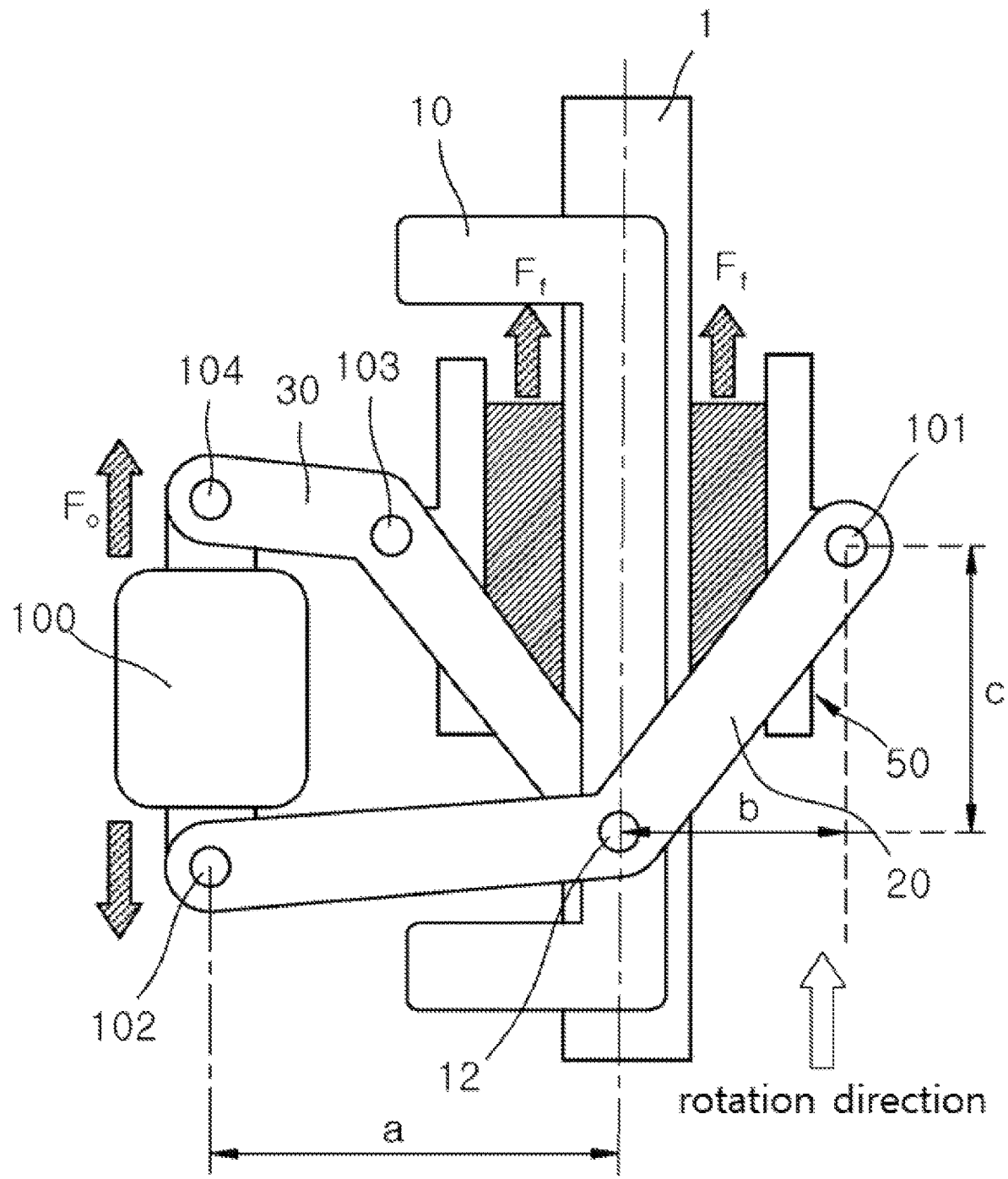
FIG. 3 shows a conceptual drawing for showing the kinematic relationship and behavior of the self-energizing brake caliper of FIG. 1.

According to FIG. 3, the first caliper arm (20) and the second caliper arm (30) rotate at the same axis (12) with respect to the caliper bracket (10). The width of the caliper bracket (10) can be wider than shown in FIG. 3 even though it is illustrated that the width of the caliper bracket (10) is narrower than that of the brake disc in order to clearly show the contacting state between the brake disc (1) and the friction members (45, 55). According to the embodiments in FIG. 3, the actuator (100) operates the first caliper arm (20) and the second caliper arm (30) in directions away from each other for generating braking force.

The first caliper arm (20) rotates in a counterclockwise direction and the second caliper arm (30) rotates in a clockwise direction. That is, the caliper arms (20, 30) perform scissor movement when the actuator (100) generates driving force ($F_O$) for braking, thereby pressing the outboard brake pad (50) and the inboard brake pad (40) to apply braking force to the brake disc (1).

In order to release the braking state, the actuator (100) operates the first caliper arm (20) and the second caliper arm (30) in a direction to come closer to each other.

The force that the first caliper arm (20) presses against the outboard brake pad (50) is greatly amplified because the first caliper arm (20) is rotatably connected to the outboard brake pad (50) at the first position (101), for example by hinge joint. The force ($F_p$) that the first caliper arm (20) presses against the outboard brake pad (50) is amplified to be a/c times the driving force ($F_O$) due to leverage effect. That is, the amplifying effect of braking force is provided because the brake disc (1) is pressed with a force which is greater than the driving force. In inboard side, the amplifying effect of braking force is also provided because the second caliper arm (30) is connected to the inboard brake pad (40) in the same way.

When the inboard brake pad (40) and the outboard brake pad (50) press the brake disc (1), a friction force ($F_f$) is generated on the contacting surface. The friction force ($F_f$) generates moment which rotates the first caliper arm (20) and the second caliper arm (30) toward the brake disc (1), thereby more amplifying the force ($F_f$). As a result, the self-energizing effect can be maximized.

Mechanically, the following relationship is derived.

$$F_p = \left(\frac{a}{c - \mu \times b}\right) \times F_o$$

μ is a friction coefficient between the brake disc (1) and the brake pad.

It can be understood from the above equation that self-locking is generated when $c = \mu \times b$.

Thus, the self-locking can be avoided by maintaining the condition of $c > \mu \times b$.

Figure 4:
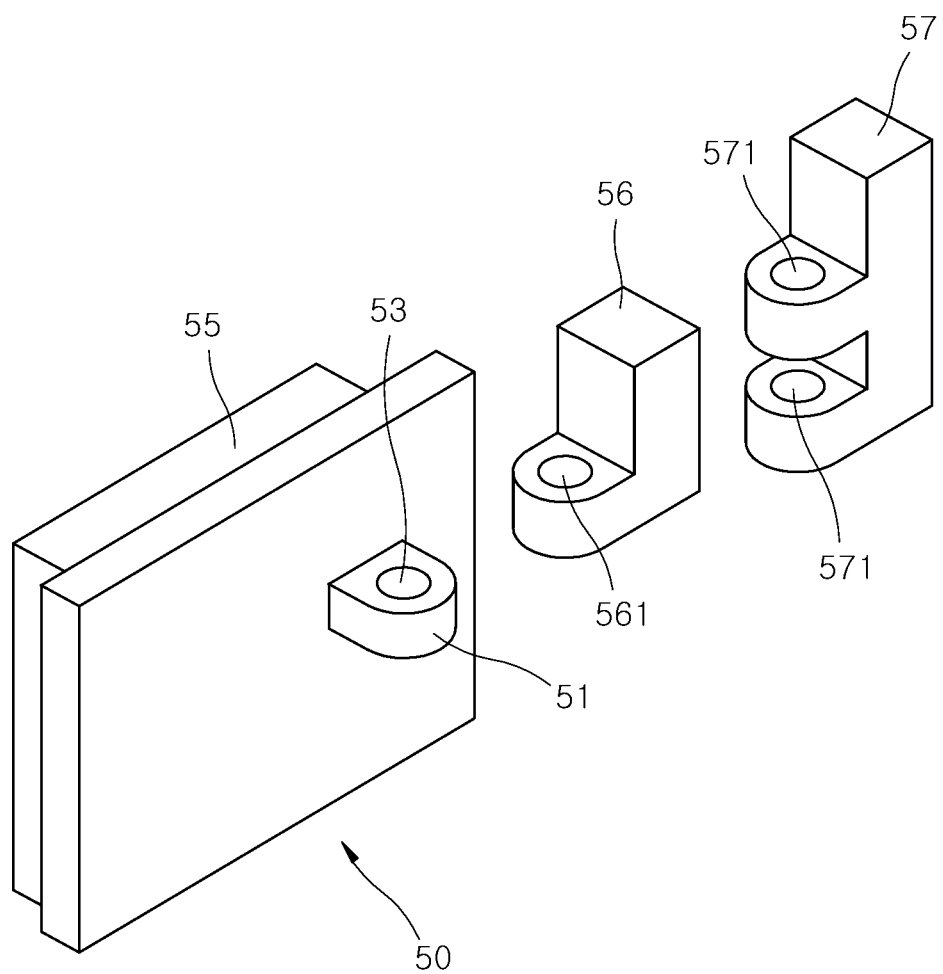
FIG. 4 shows a perspective view of hinge-members and the brake pad where the hinge-members can be mounted.
Figure 5:
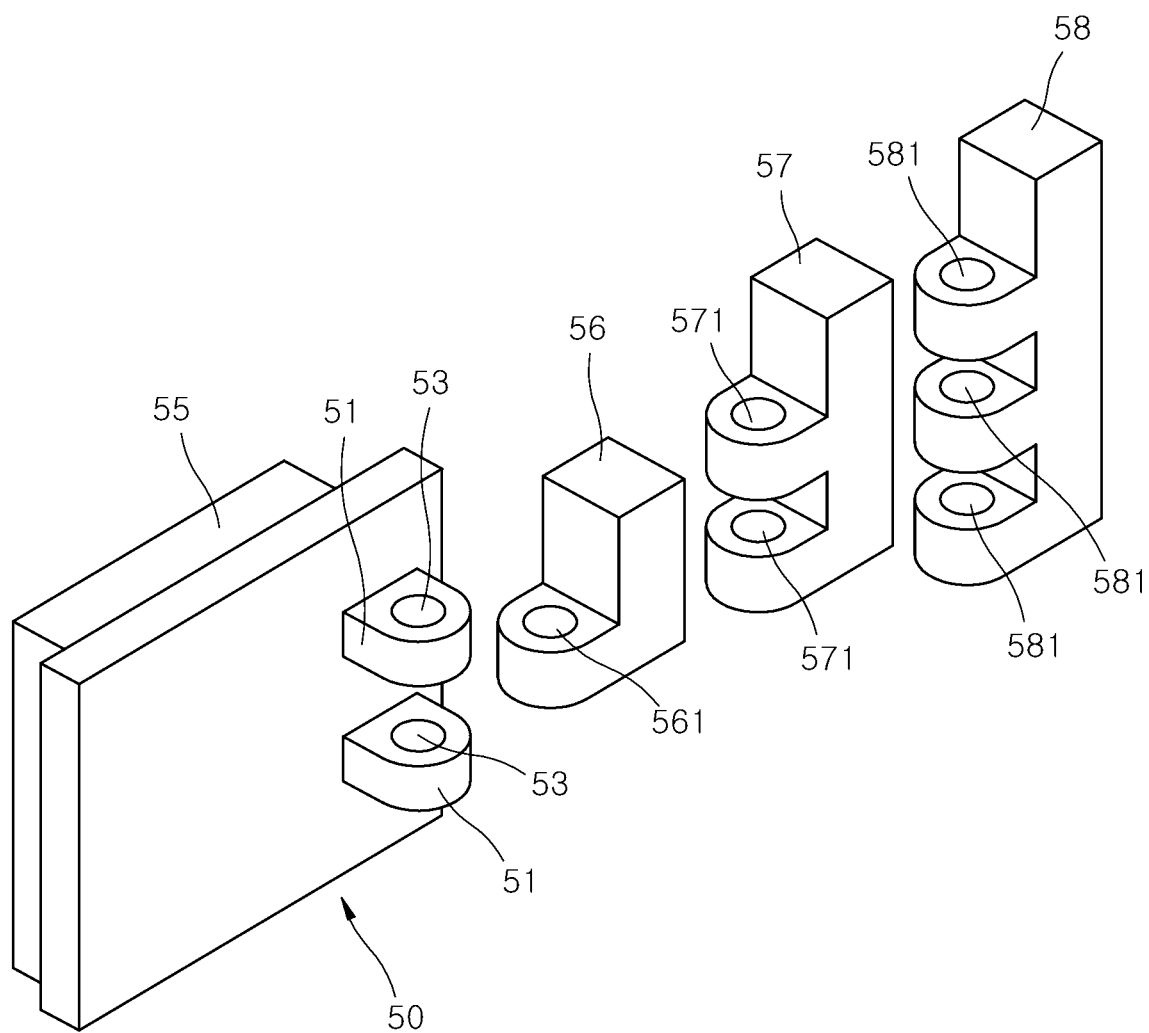
FIG. 5 shows a perspective view of alternative hinge-members and the brake pad where the hinge-members can be mounted.

FIGS. 4 and 5 show a connecting portion and a plurality of connecting portions, respectively, which can be provided at a middle portion of the outboard brake pad (50). FIGS. 4 and 5 also show hinge members (56, 57, 58) which can be connected to the connecting portion. The connecting portions and the hinge members shown in FIGS. 4 and 5 can be provided in the inboard brake pad (40).

The hinge member (56, 57, 58) has at least one hole (561, 571, 581) which can be aligned with the mounting hole (53) of the outboard brake pad (50) and the mounting hole of the first caliper arm (20) which is provided at the first position (101). The pin (8) passes through the holes of the caliper arm, the brake pad and the hinge member, thereby fastening the brake pad and the caliper arm. The pin (8) can pass through the holes downwardly or upwardly. Female thread can be formed in the inner portion of the hinge member (56, 57, 58) or can be formed in the inner portion of the mounting portion (53) of the outboard brake pad (50).

Figure 13:
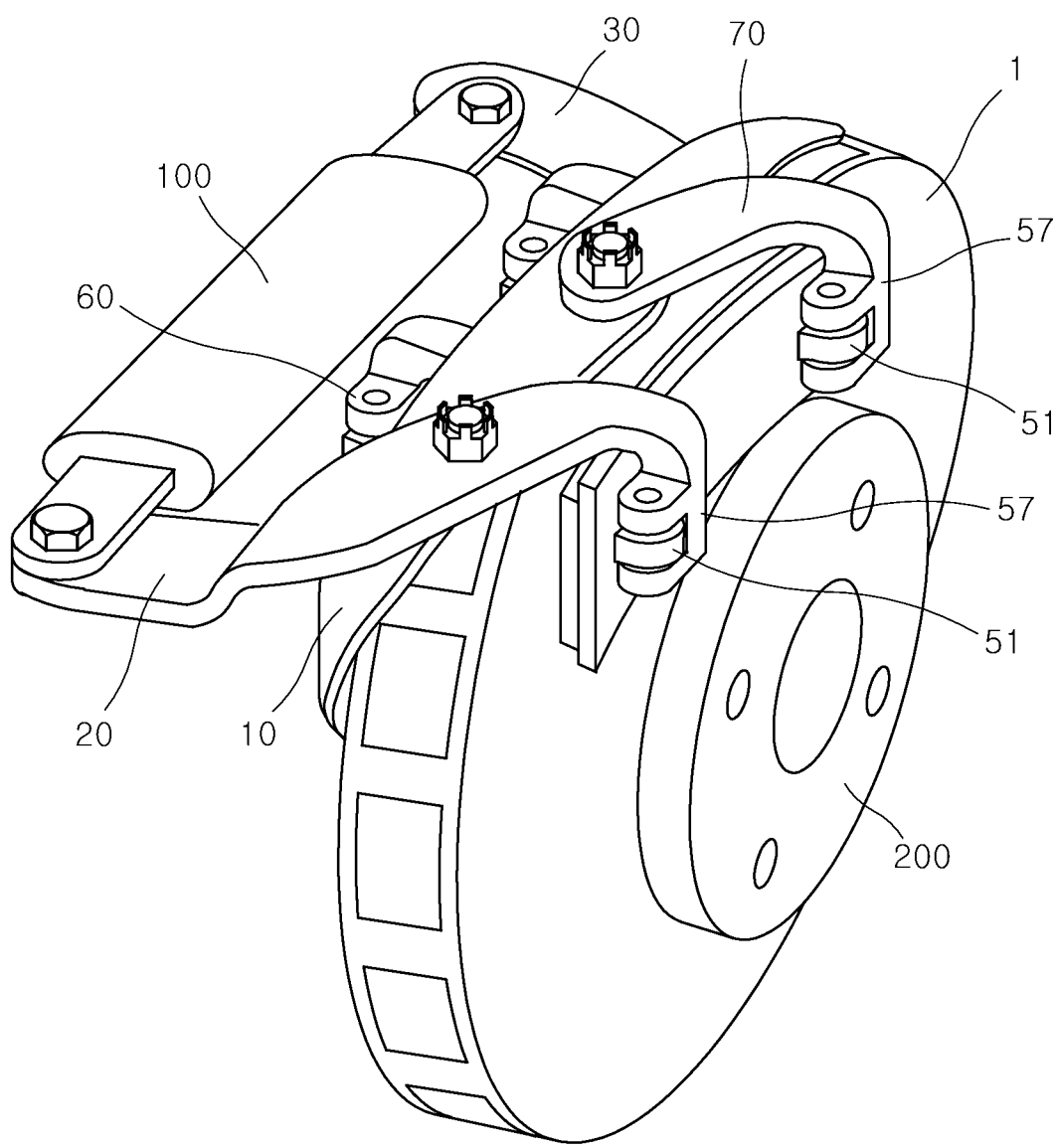
FIG. 13 shows a perspective view of a brake disc where a self-energizing brake caliper having hinge-members is mounted.

The hinge member (56, 57, 58) can be integrally formed with the first caliper arm (20). In that constitution, the holes of the hinge member (56, 57, 58) can be the mounting holes of the first caliper arm (20). Such a hinge member is shown in FIG. 13.

The fastening between the outboard brake pad and the first caliper arm can be applied to the fastening between the inboard brake pad and the second caliper arm, vice versa.

Figure 6:
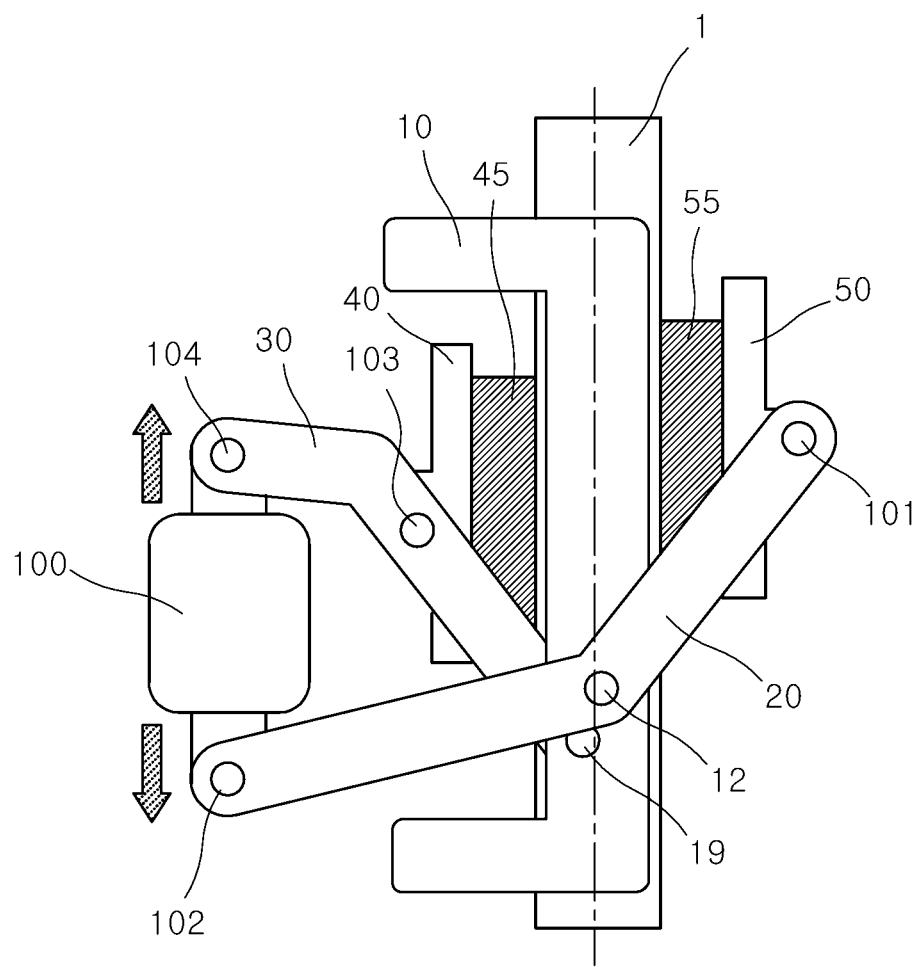
FIG. 6 shows a conceptual drawing for showing the kinematic relationship and behavior of the self-energizing brake caliper of another embodiment of the present disclosure.

FIG. 6 shows a conceptual drawing for showing the kinematic relationship and behavior of the self-energizing brake caliper of the anther embodiment of the present disclosure. The self-energizing brake caliper of FIG. 6 differs from that of FIGS. 1 to 3 in that the rotation axis of the first caliper arm (20) is different from that of the second caliper arm (30). The first caliper arm (20) is rotatably connected to the caliper bracket (10) at the axis (12). The second caliper arm (30) is rotatably connected to the caliper bracket (10) at the axis (19). The detailed description of the other components and the behavior of the embodiments of FIG. 6 is omitted because it is substantially same to those of the embodiments of FIGS. 1 to 3.

Figure 7:
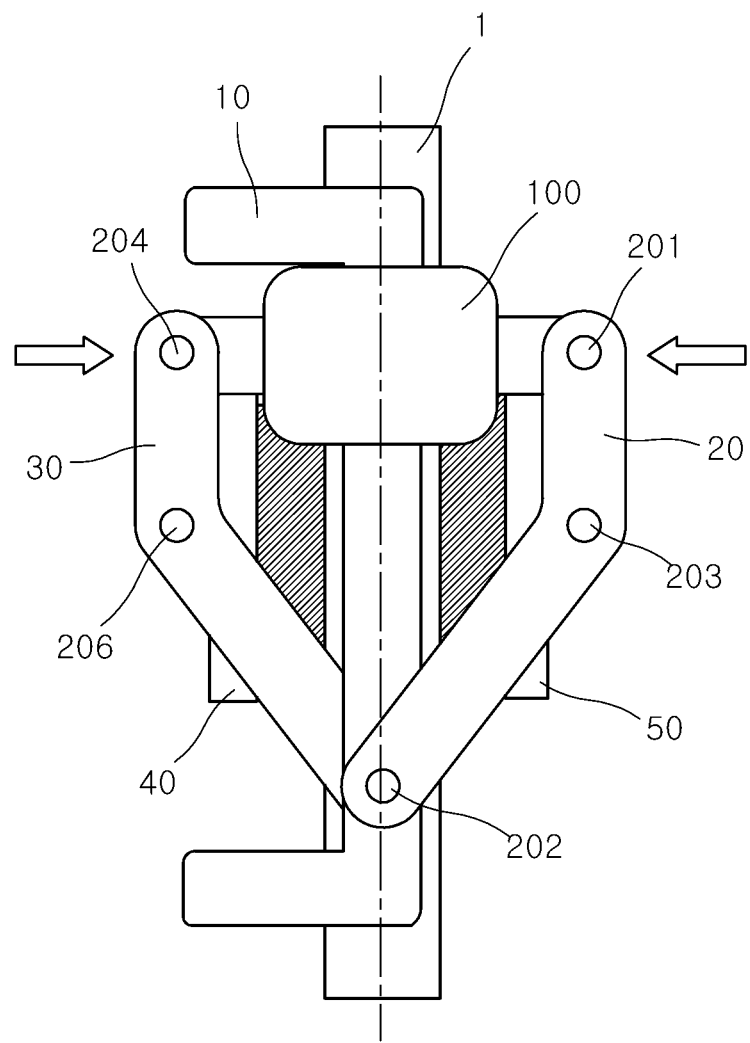
FIG. 7 shows a conceptual drawing for showing the kinematic relationship and behavior of the self-energizing brake caliper of another embodiment of the present disclosure.

FIG. 7 shows a conceptual drawing for showing the kinematic relationship and behavior of the self-energizing brake caliper of another embodiment of the present disclosure.

The first caliper arm (20) and the second caliper arm (30) are rotatably connected to the caliper bracket (10).

The first caliper arm (20) receives the power of the actuator (100) at 1-1 position (201) and is rotatably connected to the caliper bracket (10) at 2-1 position (202). The first caliper arm (20) is rotatably connected to the outboard brake pad (50) at 3-1 position (203) which is between the 1-1 position (201) and the 2-1 position (202). When the power of the actuator (100) is transferred to the first caliper arm (20) at the 1-1 position (201), the braking force is applied to the outboard brake pad (50) or is released from the outboard brake pad (50) at the 3-1 position (203).

The second caliper arm (30) receives the power of the actuator (100) at 4-1 position (204) and is rotatably connected to the caliper bracket (10) at 2-1 position (202). The second caliper arm (30) is rotatably connected to the inboard brake pad (40) at the sixth position (206) which is between the 4-1 position (204) and the 2-1 position (202). When the power of the actuator (100) is transferred to the second caliper arm (30) at the 4-1 position, the braking force is applied to the inboard brake pad (40) or is released from the inboard brake pad (40) at the sixth position (206).

The second caliper arm (30) can be rotatably connected to the caliper bracket (10) at the different axis other than the axis of the 2-1 position (202).

The connecting ways between the caliper arm and the brake pad is substantially same to those explained with reference to FIGS. 1 to 5.

In the embodiments of FIG. 7, the actuator (100) operates the first caliper arm (20) and the second caliper arm (30) to come close to each other for braking and operates the caliper arms to be away from each other for releasing.

Figure 8:
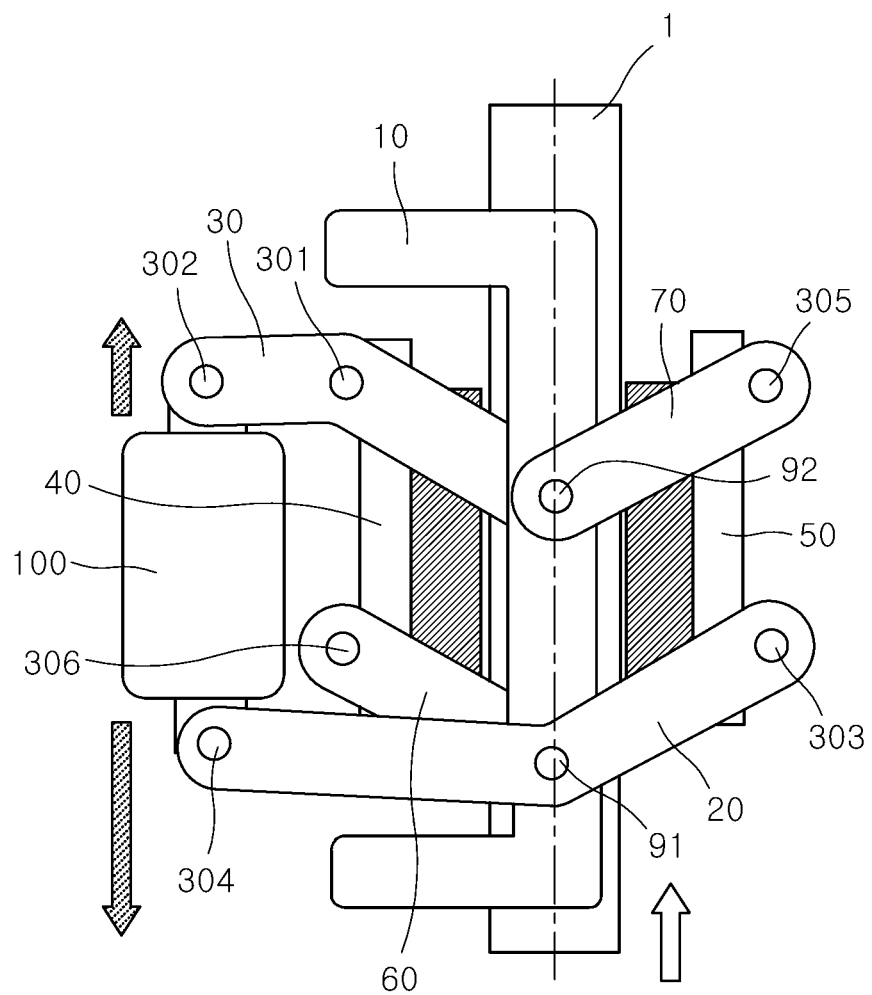
FIG. 8 shows a conceptual drawing for showing the kinematic relationship and behavior of the self-energizing brake caliper of another embodiment of the present disclosure
Figure 10:
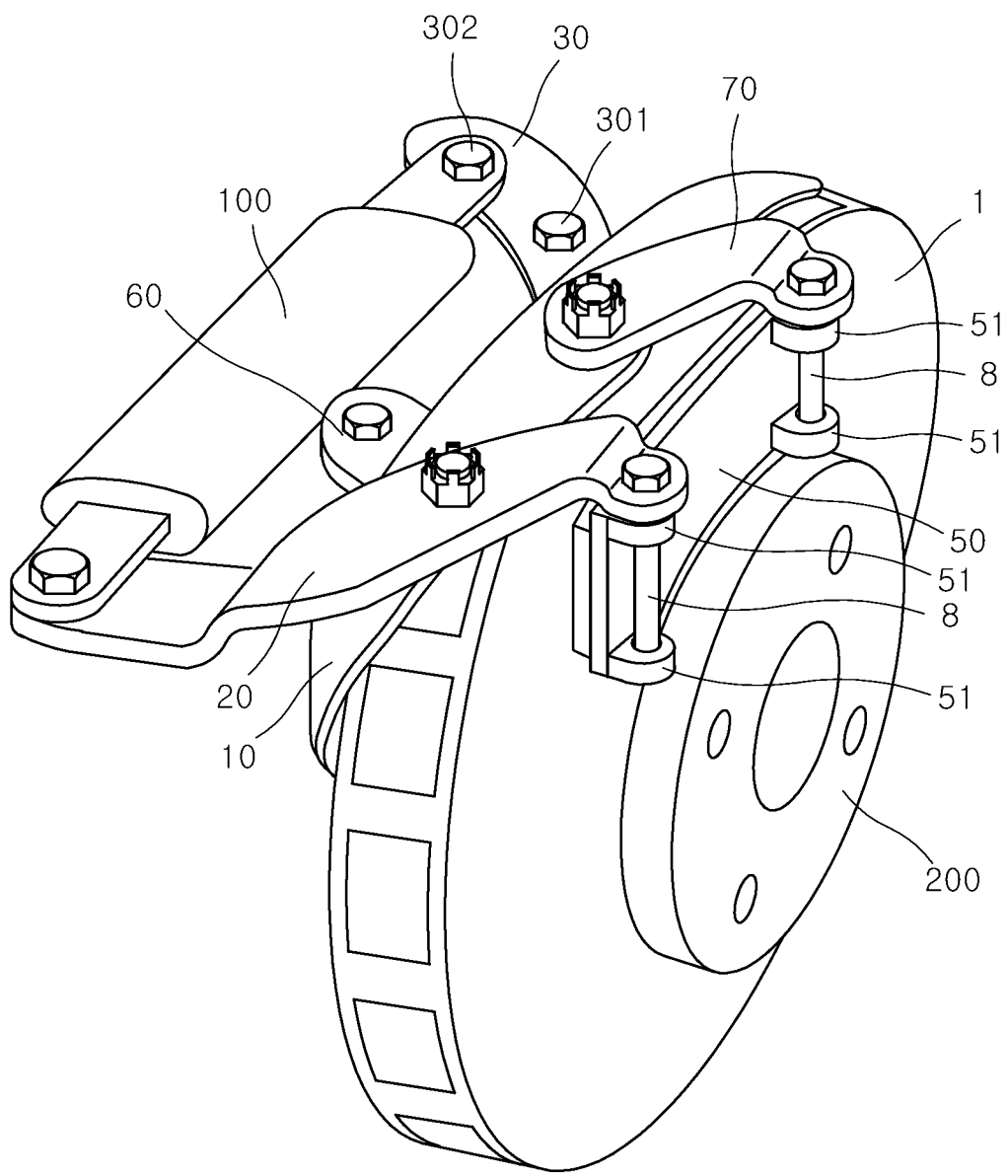
FIG. 10 shows a perspective view of a brake disc where the self-energizing brake caliper of FIG. 8 is mounted.

FIG. 8 shows a conceptual drawing for showing the kinematic relationship and behavior of the self-energizing brake caliper of another embodiment of the present disclosure. FIG. 10 shows the perspective view of the self-energizing brake caliper of FIG. 8.

Figure 16:
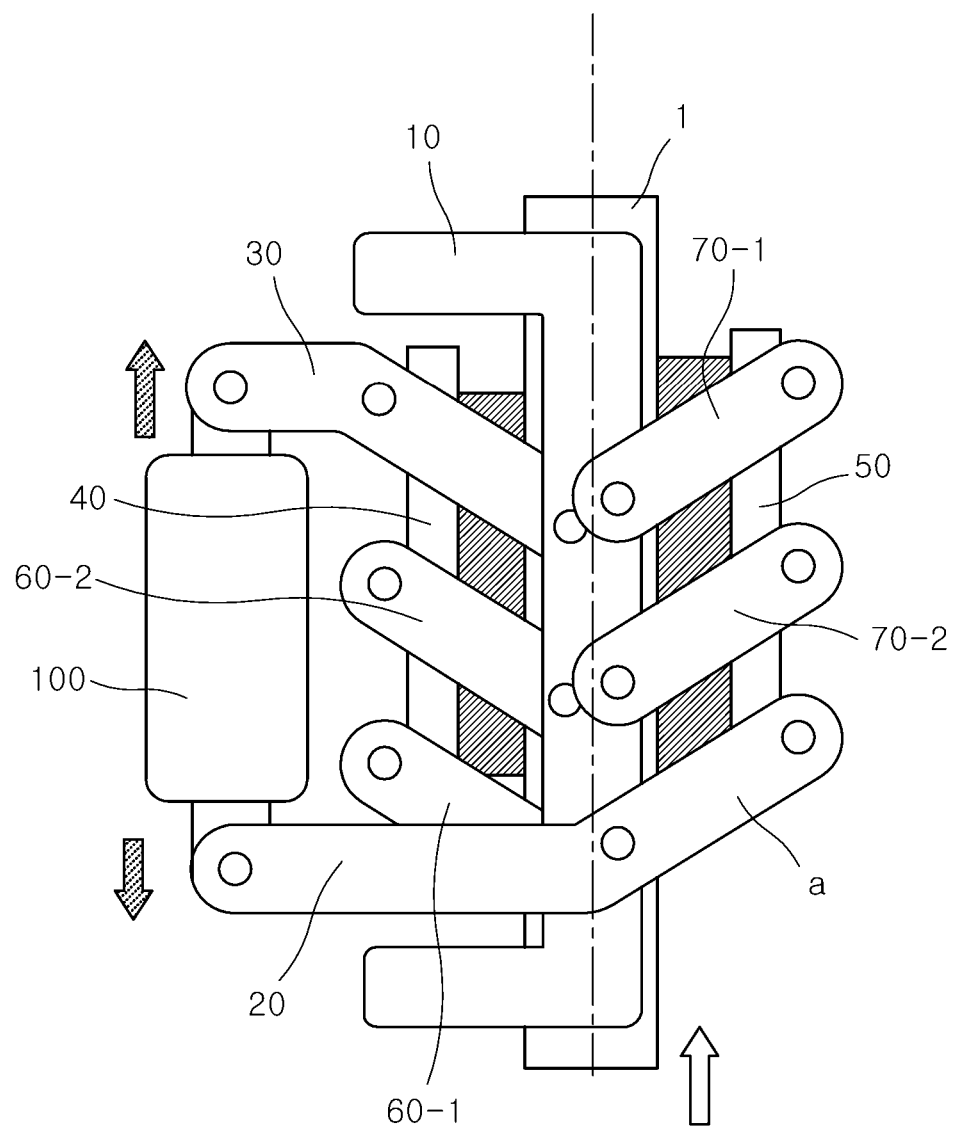
FIG. 16 shows a conceptual drawing for showing the kinematic relationship and behavior of the self-energizing brake caliper of another embodiment of the present disclosure.
Figure 17:
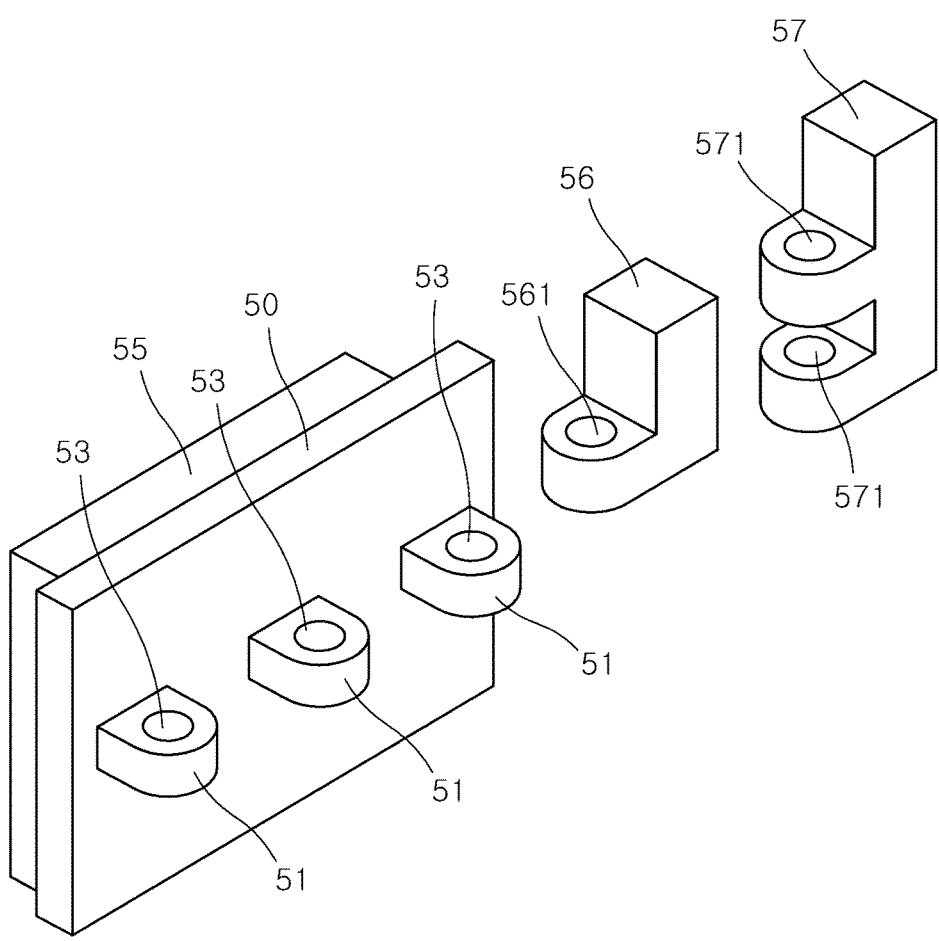
FIG. 17 shows a perspective view of the alternative hinge-members and the brake pad where the hinge-members can be mounted.
Figure 18:
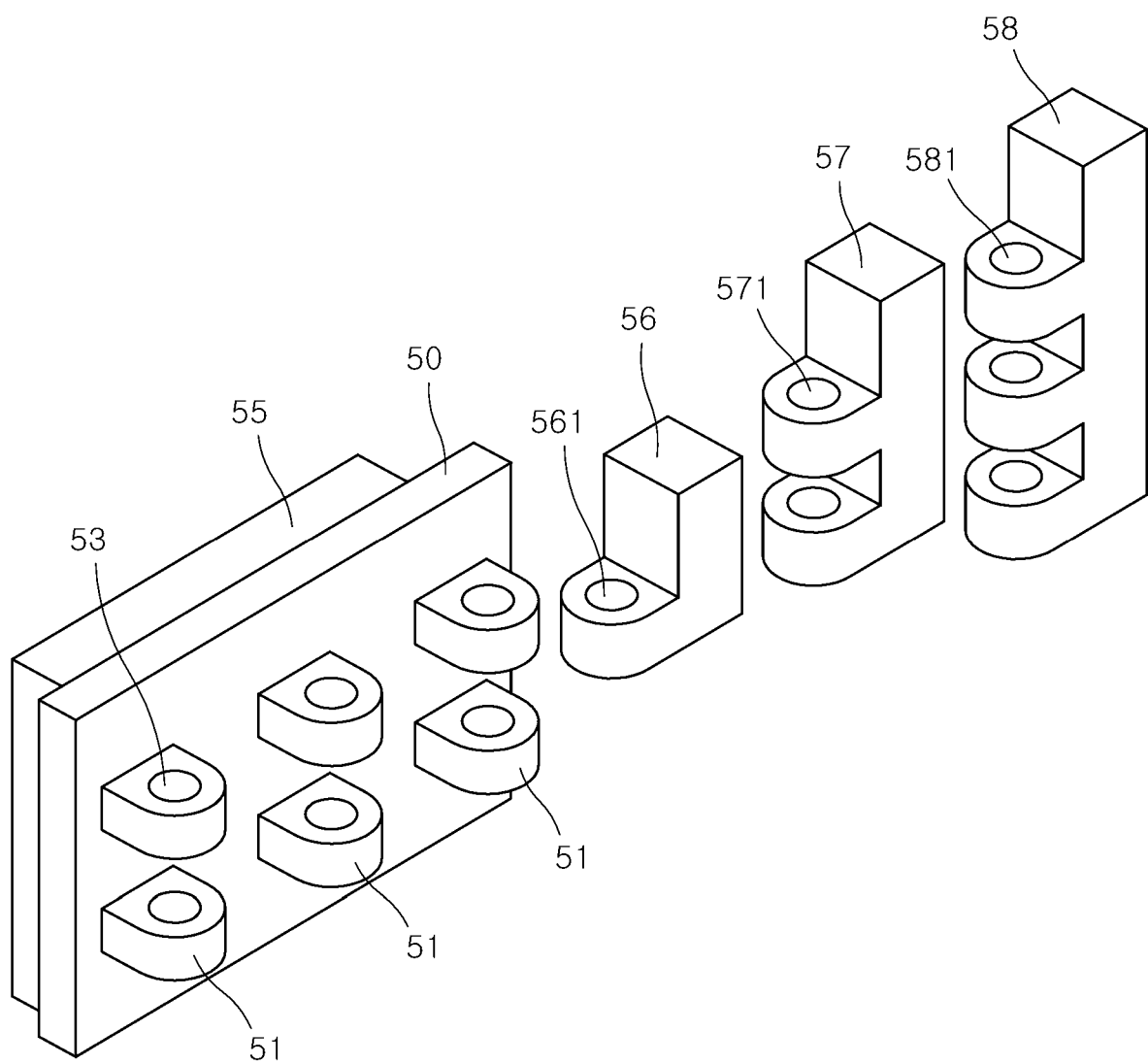
FIG. 18 shows a perspective view of the alternative hinge-members and the brake pad where the hinge-members can be mounted.

The self-energizing brake caliper of FIGS. 8 and 10 substantially differs from that of FIGS. 1 to 3 in that it has further at least one first auxiliary arm (60) and at least one second auxiliary arm (70). FIG. 8 shows the self-energizing brake caliper which has one first auxiliary arm (60) and one second auxiliary arm (70) and FIG. 16 shows the self-energizing brake caliper which has two first auxiliary arms (60-1, 60-2) and two second auxiliary arms (70-1, 70-2). More than two auxiliary arms can be adopted in the self-energizing brake caliper of the present disclosure. FIGS. 17 and 18 shows the examples of the connecting portions (51) and the hinge members (56, 57, 58) which can be applied to the self-energizing brake caliper of FIG. 16. The number of the connecting portions (51) increases according to the number of auxiliary arms.

According to the embodiments having auxiliary arms, the first caliper arm (20) is rotatably connected to the caliper bracket (10) at the first rotation axis (91) and the second caliper arm (30) is rotatably connected to the caliper bracket (10) at the second rotation axis (92).

The first caliper arm (20) is rotatably connected to the outboard brake pad (50) at 3-2 position (303) and receives the power of the actuator (100) at 4-2 position (304) which is inboard side.

The second caliper arm (30) is rotatably connected to the inboard brake pad (40) at 1-2 position (301) and receives the power of the actuator (100) at 2-2 position (302) which is inboard side.

The first auxiliary arm (60) is rotatably connected to the caliper bracket at the first rotation axis (91) and is rotatably connected to the inboard brake pad (40) at 6-1 position (306).

The second auxiliary arm (70) is rotatably connected to the caliper bracket at the second rotation axis (92) and is rotatably connected to the outboard brake pad (50) at the 5-1 position (305).

The connecting ways between the caliper arms and brake pads are substantially same to the aforementioned embodiments.

The connecting ways between the first auxiliary arm (60) and the inboard brake pad (40) and the connecting ways between the second auxiliary arm (70) and the outboard brake pad (50) are substantially same to the connecting ways between the caliper arm and the brake pad.

The second auxiliary arm (70) can be provided to be parallel to the outboard portion of the first caliper arm (20). In that configuration, the second auxiliary arm (70), the outboard portion of the first caliper arm (20), the brake disc (1) and the outboard brake pad (50) can be a four-bar linkage of parallelogram. The friction member of the outboard brake pad (50) can be parallel to the brake disc (1). In the same way, the first auxiliary arm (60) can be provided to be parallel to the inboard portion of the second caliper arm (30). In that configuration, the first auxiliary arm (60), the inboard portion of the second caliper arm (30), the brake disc (1) and the inboard brake pad (40) can be a four-bar linkage of parallelogram. The friction member of the inboard brake pad (40) can be parallel to the brake disc (1). The parallel relationship can be maintained until the end of the life of the friction member, thereby preventing the friction member from unevenly worn. The four-bar linkage of parallelogram can be applied to the self-energizing brake caliper of FIGS. 9, 14, 15 and 16.

Figure 9:
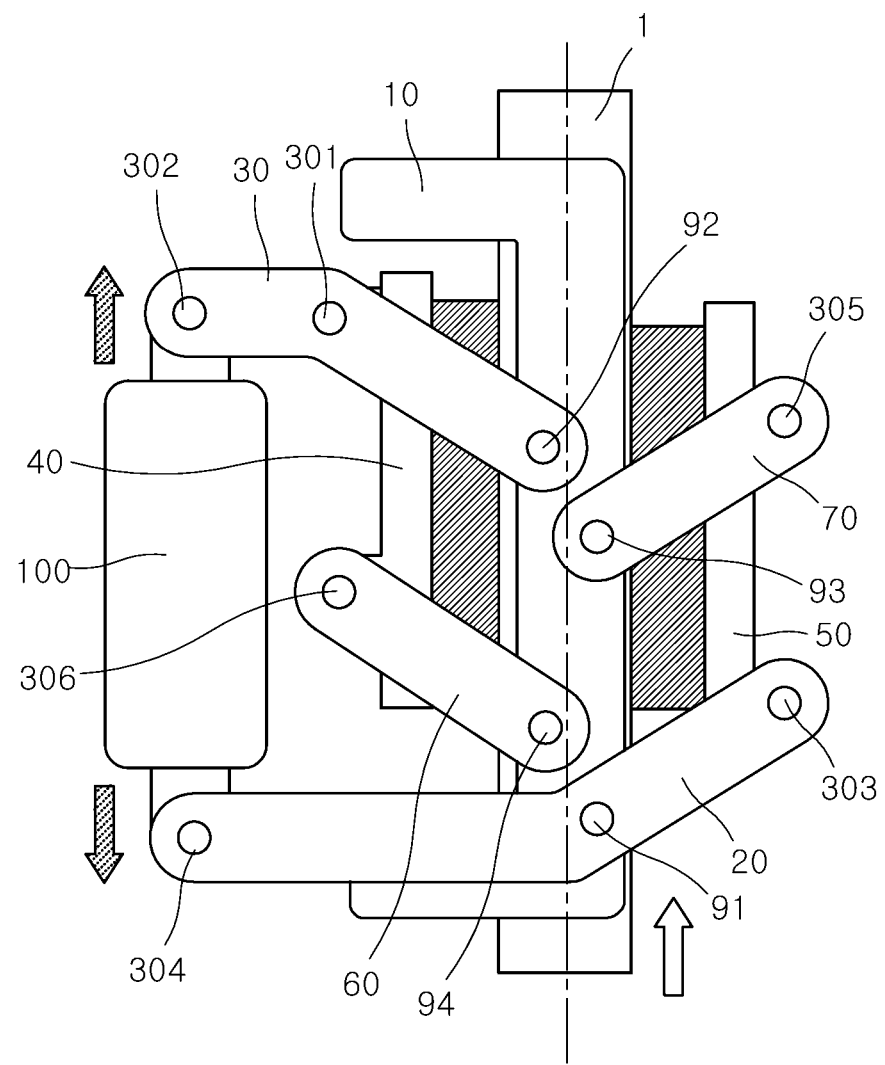
FIG. 9 shows a conceptual drawing for showing the kinematic relationship and behavior of the self-energizing brake caliper of another embodiment of the present disclosure.

FIG. 9 shows a conceptual drawing for showing the kinematic relationship and behavior of the self-energizing brake caliper of another embodiment of the present disclosure.

The self-energizing brake caliper of FIG. 9 differs from that of FIG. 8 in that the rotation axis of the first auxiliary arm (60) is different from that of the second auxiliary arm (70). The rotation axis of the first auxiliary arm (60) is the fourth rotation axis (94) and the rotation axis of the second auxiliary arm (70) is the third rotation axis (93).

Figure 11:
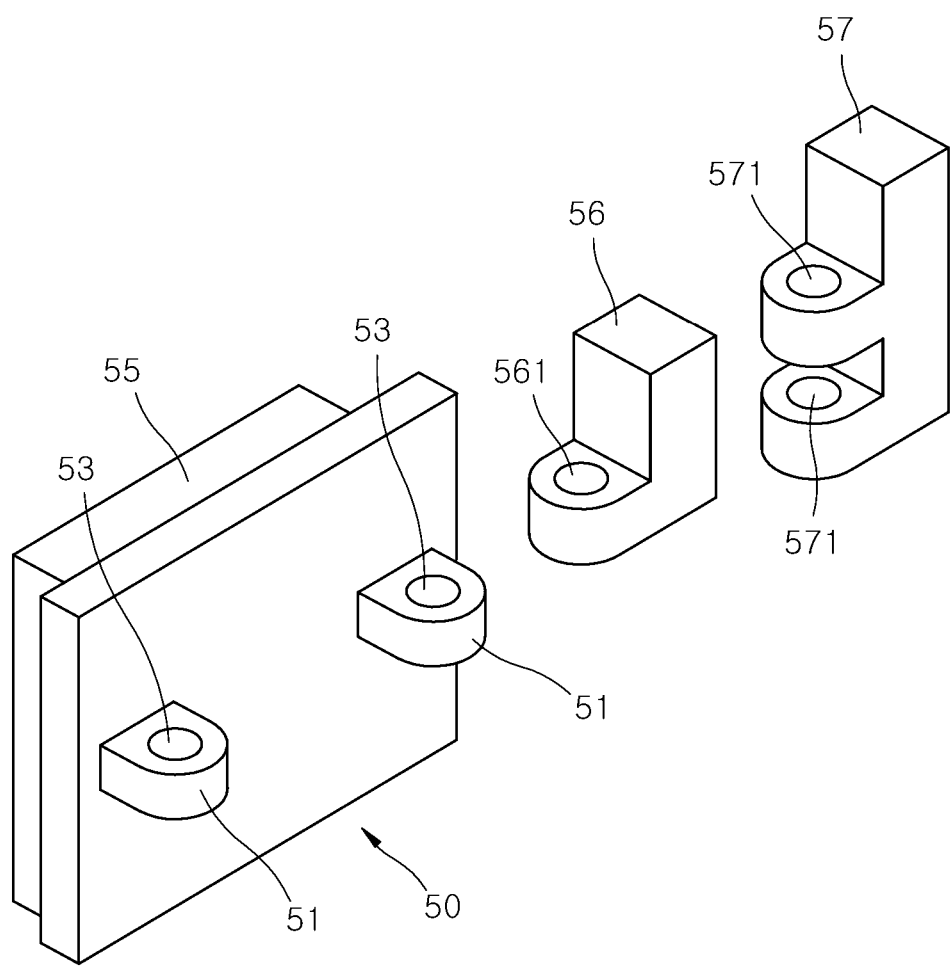
FIG. 11 shows a perspective view of the alternative hinge-members and the brake pad where the hinge-members can be mounted.
Figure 12:
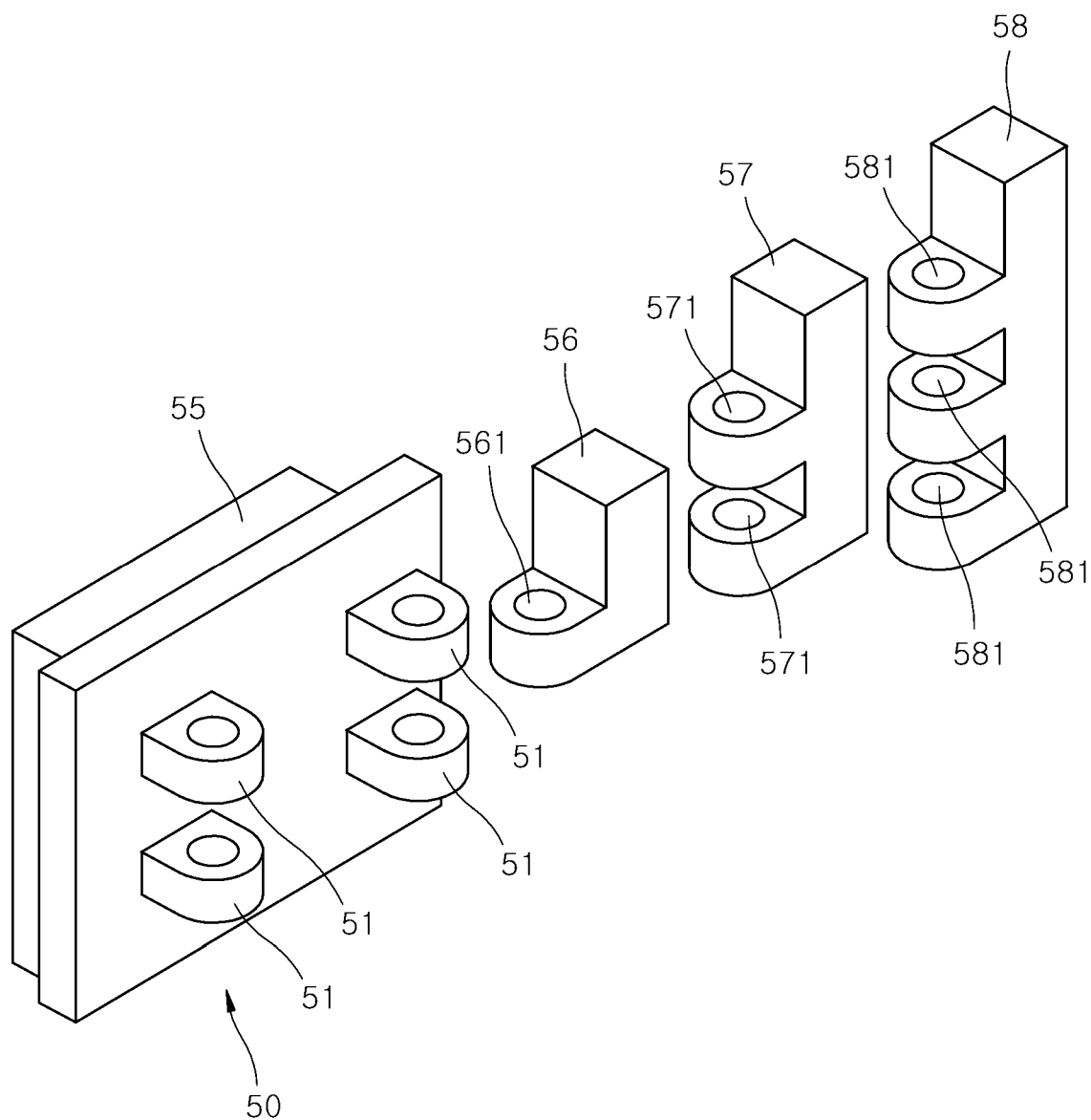
FIG. 12 shows a perspective view of the alternative hinge-members and the brake pad where the hinge-members can be mounted.

FIGS. 11 and 12 shows the examples of the brake pads and the hinge members which can be applied to the embodiments of FIGS. 8 and 9. The brake pads of FIGS. 11 and 12 further has the connecting portions for the auxiliary arm.

Figure 14:
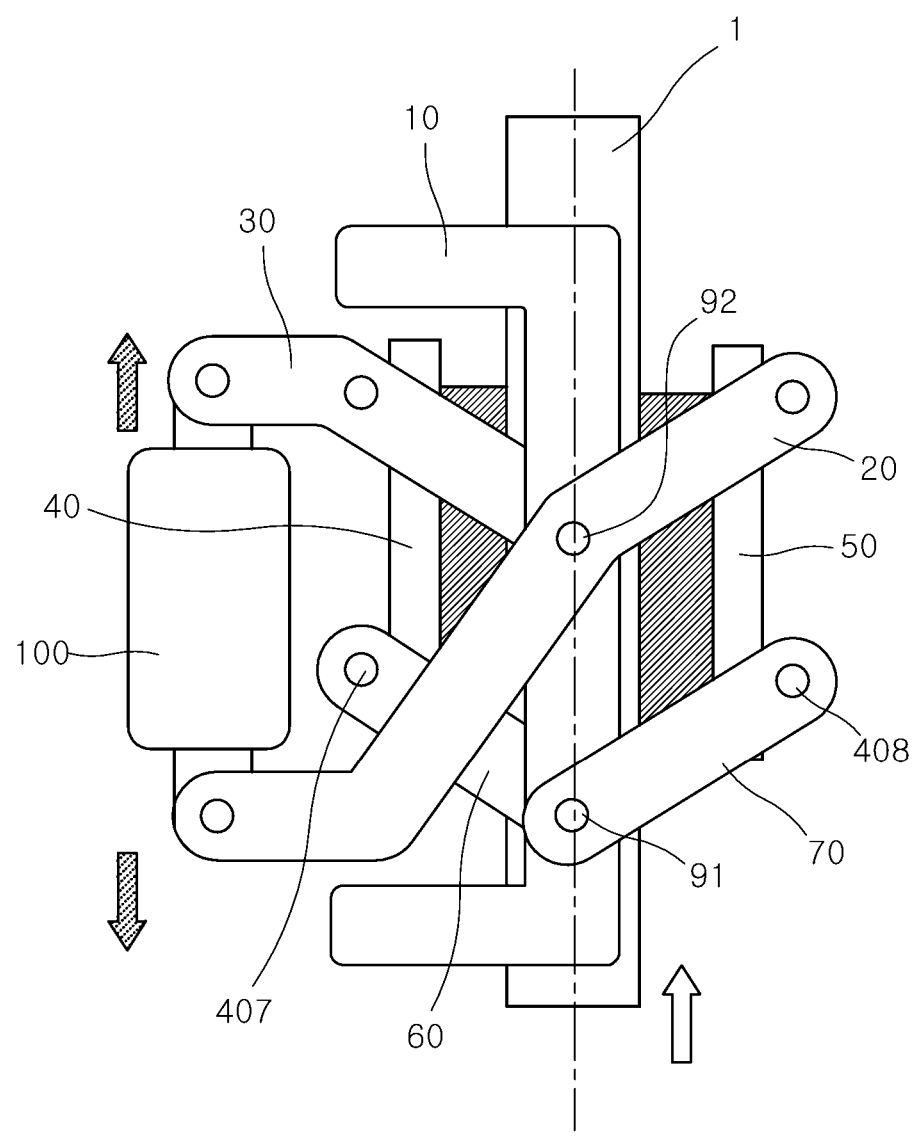
FIG. 14 shows a conceptual drawing for showing the kinematic relationship and behavior of the self-energizing brake caliper of another embodiment of the present disclosure.

FIG. 14 shows a conceptual drawing for showing the kinematic relationship and behavior of the self-energizing brake caliper of another embodiment of the present disclosure. The self-energizing brake caliper of FIG. 14 differs from that of FIGS. 1 to 3 in that it further comprises the first auxiliary arm (60) and the second auxiliary arm (70) which are shown in FIG. 14. The first auxiliary arm (60) of FIG. 14 is rotatably connected to the caliper bracket (10) at the rotation axis (91) and is rotatably connected to the inboard brake pad (40) at the seventh position (407). The second auxiliary arm (70) of FIG. 14 is rotatably connected to the caliper bracket (10) at the rotation axis (91) and is rotatably connected to the outboard brake pad (50) at the eighth position (408).

The first auxiliary arm (60) and the second auxiliary arm (70) can rotate at the different rotation axis with respect to the caliper bracket (10).

Figure 15:
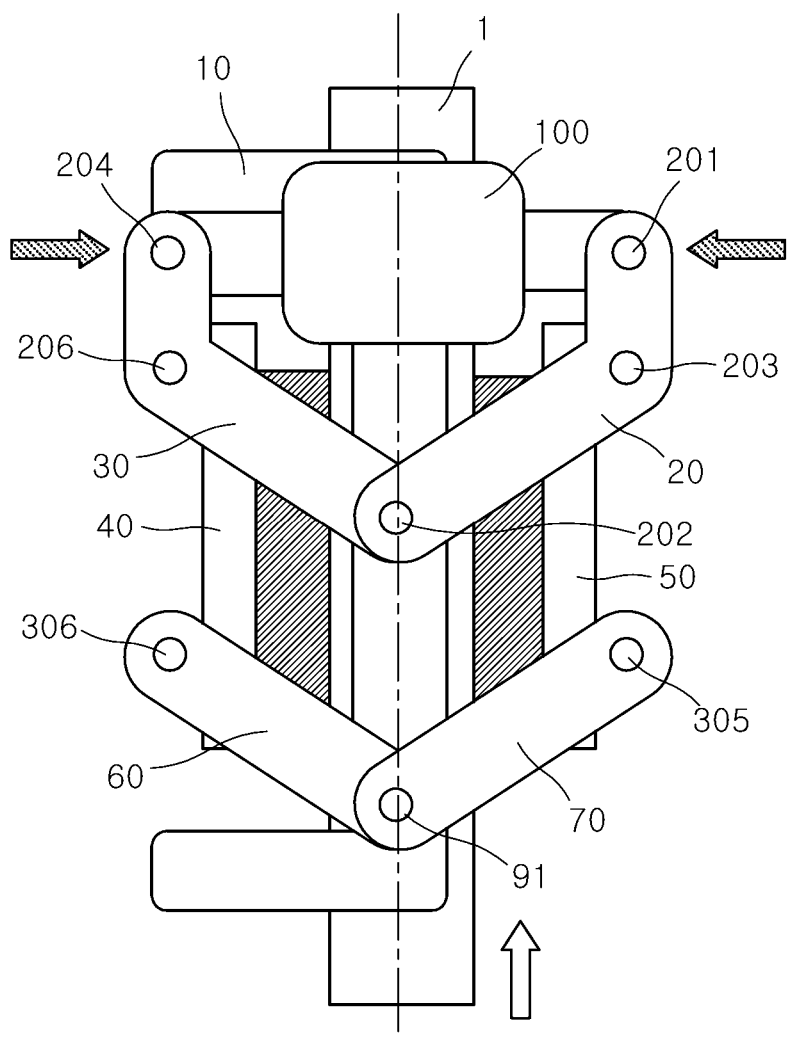
FIG. 15 shows a conceptual drawing for showing the kinematic relationship and behavior of the self-energizing brake caliper of another embodiment of the present disclosure.

FIG. 15 shows a conceptual drawing for showing the kinematic relationship and behavior of the self-energizing brake caliper of another embodiment of the present disclosure. The self-energizing brake caliper of FIG. 15 differs from that of FIG. 7 in that it further comprises a first auxiliary arm (60) which is shown in FIG. 15 and a second auxiliary arm (70) which is shown in FIG. 15. The first auxiliary arm (60) is rotatably connected to the caliper bracket (10) at the rotation axis (91) and is rotatably connected to the inboard brake pad (40) at 6-1 position (306). The second auxiliary arm (70) is rotatably connected to the caliper bracket (10) at the rotation axis (91) and is rotatably connected to the outboard brake pad (50) at 5-1 position (305). The first auxiliary arm (60) and the second auxiliary arm (70) can rotate at the different rotation axis with respect to the caliper bracket (10). The operation of the self-energizing brake caliper of FIG. 15 is substantially the same to that of FIG. 7 except that the auxiliary arms further increase the friction power.

According to the present disclosure, the linkage for generating scissor movement generates self-energizing effect for braking. Thus, the self-locking which occurs in the wedge type self-energizing brake caliper can be avoided according to the present disclosure.

The present disclosure can also be applied to the configuration of conveyor belt which moves straight.

Although the present disclosure has been described with reference to accompanying drawings, the scope of the present disclosure is determined by the claims described below and should not be interpreted as being restricted by the embodiments and/or drawings described above. It should be clearly understood that improvements, changes and modifications of the present disclosure disclosed in the claims and apparent to those skilled in the art also fall within the scope of the present disclosure. Accordingly, this description is to be taken only by way of example and not to otherwise limit the scope of the embodiments herein.

What is claimed is:
1. A self-energizing brake caliper comprising:
   a caliper bracket fixed to a vehicle frame;
   a first caliper arm rotatably connected to the caliper bracket with a rotational axis parallel to a radial direction with respect to a brake disc;

a second caliper arm rotatably connected to the caliper bracket with a rotational axis parallel to the radial direction with respect to the brake disc;
an inboard brake pad; and
an outboard brake pad;
wherein the first caliper arm is rotatably connected to the outboard brake pad at a first position and is configured to press against the outboard brake pad at the first position by receiving the power of an actuator at a second position which is at inboard side; and extends from the first position to the second position via a position at which the first caliper arm is connected to the caliper bracket,
wherein the second caliper arm is rotatably connected to the inboard brake pad at a third position and is configured to press against the inboard brake pad at the third position by receiving the power of an actuator at a fourth position which is at the inboard side, and extends from the fourth position to a position at which the second caliper arm is connected to the caliper bracket via the third position, and
wherein a friction force generated by the outboard brake pad during braking creates a moment for the first caliper arm to exert an axial force on the outboard brake pad toward the inboard side, and a friction force generated by the inboard brake pad during the braking creates a moment for the second caliper arm to exert an axial force on the inboard brake pad toward the outboard side.

2. The self-energizing brake caliper according to claim 1, wherein the first caliper arm and the second caliper arm are rotatably connected to the caliper bracket at the same rotation axis or at different rotation axis.

3. The self-energizing brake caliper according to claim 1, further comprising a pin,
wherein a first mounting hole is provided at one of the inboard brake pad and the second caliper arm; a second mounting hole is provided at the other one of the inboard brake pad and the second caliper arm; and the pin passes through the first mounting hole and the second mounting hole to enable hinge movement of the inboard brake pad and the second caliper arm with respect to each other.

4. The self-energizing brake caliper according to claim 1, further comprising a pin,
wherein a third mounting hole is provided at one of the outboard brake pad and the first caliper arm; a fourth mounting hole is provided at the other one of the outboard brake pad and the first caliper arm; and the pin passes through the third mounting hole and the fourth mounting hole to enable hinge movement of the outboard brake pad and the first caliper arm with respect to each other.

5. The self-energizing brake caliper according to claim 1, further comprising at least one first auxiliary arm and at least one second auxiliary arm,
wherein the first caliper arm is rotatably connected to the caliper bracket at a first rotation axis; the second caliper arm is rotatably connected to the caliper bracket at a second rotation axis; the first auxiliary arm is rotatably connected to the caliper bracket and is rotatably connected to the inboard brake pad at 6-1 position; and the second auxiliary arm is rotatably connected to the caliper bracket and is rotatably connected to the outboard brake pad at 5-1 position.

6. The self-energizing brake caliper according to claim 5, wherein the first auxiliary arm is rotatably connected to the caliper bracket at the first rotation axis; and the second auxiliary arm is rotatably connected to the caliper bracket at the second rotation axis.

7. The self-energizing brake caliper according to claim 5, wherein the first auxiliary arm is rotatably connected to the caliper bracket at a third rotation axis other than the first rotation axis; and the second auxiliary arm is rotatably connected to the caliper bracket at a fourth rotation axis other than the second rotation axis.

8. The self-energizing brake caliper according to claim 5, further comprising a pin,
wherein a 1-1 mounting hole is provided at one of the first auxiliary arm and the inboard brake pad; a 1-2 mounting hole is provided at the other one of the first auxiliary arm and the inboard brake pad; and the pin passes through the 1-1 mounting hole and the 1-2 mounting hole to enable hinge movement of the inboard brake pad and the first auxiliary arm with respect to each other.

9. The self-energizing brake caliper according to claim 5, further comprising a pin,
wherein a 2-1 mounting hole is provided at one of the second auxiliary arm and the outboard brake pad; a 2-2 mounting hole is provided at the other one of the second auxiliary arm and the outboard brake pad; and the pin passes through the 2-1 mounting hole and the 2-2 mounting hole to enable hinge movement of the outboard brake pad and the second auxiliary arm with respect to each other.

10. The self-energizing brake caliper according to claim 1, further comprising a first auxiliary arm which is rotatably connected to the caliper bracket and is rotatably connected to the inboard brake pad at a seventh position; and a second auxiliary arm which is rotatably connected to the caliper bracket and is rotatably connected to the outboard brake pad at an eight position.

11. The self-energizing brake caliper according to claim 10, further comprising a pin,
wherein a 3-1 mounting hole is provided at one of the first auxiliary arm and the inboard brake pad; a 3-2 mounting hole is provided at the other one of the first auxiliary arm and the inboard brake pad; and the pin passes through the 3-1 mounting hole and the 3-2 mounting hole to enable hinge movement of the inboard brake pad and the first auxiliary arm with respect to each other.

12. The self-energizing brake caliper according to claim 10, further comprising a pin,
wherein a 4-1 mounting hole is provided at one of the second auxiliary arm and the outboard brake pad; a 4-2 mounting hole is provided at the other one of the second auxiliary arm and the outboard brake pad; and the pin passes through the 4-1 mounting hole and the 4-2 mounting hole to enable hinge movement of the outboard brake pad and the second auxiliary arm with respect to each other.

13. The self-energizing brake caliper according to claim 5, wherein the first auxiliary arm is configured to be parallel to the inboard portion of the second caliper arm; and the second auxiliary arm is configured to be parallel to the outboard portion of the first caliper arm.

14. A self-energizing brake caliper comprising:
a caliper bracket fixed to a vehicle frame;
a first caliper arm rotatably connected to the caliper bracket;
a second caliper arm rotatably connected to the caliper bracket;

an inboard brake pad; and an outboard brake pad;

wherein the first caliper arm receives the power of an actuator at 1-1 position, is rotatably connected to the caliper bracket at 2-1 position, is rotatably connected to the outboard brake pad at 3-1 position which is between the 1-1 position and the 2-1 position, and is configured to press against the outboard brake pad at the 3-1 position by the power of the actuator; and wherein the second caliper arm receives the power of an actuator at 4-1 position, is rotatably connected to the caliper bracket at 2-1 position, is rotatably connected to the inboard brake pad at an intermediate position which is between the 4-1 position and the 2-1 position, and is configured to press against the inboard brake pad at the intermediate position by the power of the actuator.

15. The self-energizing brake caliper according to claim 14, wherein the first caliper arm and the second caliper arm are rotatably connected to the caliper bracket at the same rotation axis or at different rotation axis.

16. The self-energizing brake caliper according to claim 14, further comprising a pin, wherein a first mounting hole is provided at one of the inboard brake pad and the second caliper arm; a second mounting hole is provided at the other one of the inboard brake pad and the second caliper arm; and the pin passes through the first mounting hole and the second mounting hole to enable hinge movement of the inboard brake pad and the second caliper arm with respect to each other.

17. The self-energizing brake caliper according to claim 14, further comprising a pin, wherein a third mounting hole is provided at one of the outboard brake pad and the first caliper arm; a fourth mounting hole is provided at the other one of the outboard brake pad and the first caliper arm; the pin passes through the third mounting hole and the fourth mounting hole to enable hinge movement of the outboard brake pad and the first caliper arm with respect to each other.

18. The self-energizing brake caliper according to claim 14, further comprising a first auxiliary arm which is rotatably connected to the caliper bracket and is rotatably connected to the inboard brake pad at a 6-1 position; and a second auxiliary arm which is rotatably connected to the caliper bracket and is rotatably connected to the outboard brake pad at a 5-1 position.

19. The self-energizing brake caliper according to claim 18, further comprising a pin, wherein a 5-1 mounting hole is provided at one of the first auxiliary arm and the inboard brake pad; a 5-2 mounting hole is provided at the other one of the first auxiliary arm and the inboard brake pad; and the pin passes through the 5-1 mounting hole and the 5-2 mounting hole to enable hinge movement of the inboard brake pad and the first auxiliary arm with respect to each other.

20. The self-energizing brake caliper according to claim 18, further comprising a pin, wherein a 6-1 mounting hole is provided at one of the second auxiliary arm and the outboard brake pad; a 6-2 mounting hole is provided at the other one of the second auxiliary arm and the outboard brake pad; and the pin passes through the 6-1 mounting hole and the 6-2 mounting hole to enable hinge movement of the outboard brake pad and the second auxiliary arm with respect to each other.

* * * * *

UNITED STATES PATENT AND TRADEMARK OFFICE
CERTIFICATE OF CORRECTION

PATENT NO. : 10,926,744 B2  
APPLICATION NO. : 16/531450  
DATED : February 23, 2021  
INVENTOR(S) : Kwangjin Michael Lee Page 1 of 1

It is certified that error appears in the above-identified patent and that said Letters Patent is hereby corrected as shown below:

On the Title Page

Item "(73) Assignee" should read:  
Kyung Chang Industrial Co., Ltd., Daegu (KR); Kwangjin Michael Lee, Daegu (KR)

Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*